(12) United States Patent
Mihlbauer et al.

(10) Patent No.: US 7,771,592 B2
(45) Date of Patent: *Aug. 10, 2010

(54) AQUARIUM FILTER

(75) Inventors: Brad L. Mihlbauer, Mukwonago, WI (US); Christopher L. Hawker, Santa Cruz, CA (US); David R. Troop, II, Kenosha, WI (US); Lonnie Austin Ready, West Columbia, SC (US); Giacomo Guoli, Milan (IT); Fabio Bellia, Trebaseleghe (IT)

(73) Assignee: Newa Tecno Industria s.r.l., Loreggia (PD) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 12/468,689

(22) Filed: May 19, 2009

(65) Prior Publication Data

US 2009/0223885 A1    Sep. 10, 2009

Related U.S. Application Data

(62) Division of application No. 11/696,767, filed on Apr. 5, 2007, now Pat. No. 7,618,534.

(60) Provisional application No. 60/791,830, filed on Apr. 13, 2006.

(30) Foreign Application Priority Data

Oct. 5, 2006  (IT) .......................... PD2006A0367
Mar. 8, 2007  (EP) ................................ 70103798

(51) Int. Cl.
  *A01K 63/04*    (2006.01)
(52) U.S. Cl. ............... 210/167.27; 210/232; 210/416.2; 119/259

(58) Field of Classification Search ................. 210/150, 210/151, 167.21, 167.22, 167.27, 232, 416.1, 210/416.2; 119/259, 260
See application file for complete search history.

(56) References Cited

U.S. PATENT DOCUMENTS

| 2,275,428 | A | 3/1942 | Haldeman |
| 2,665,250 | A | 1/1954 | Willinger et al. |
| 3,511,376 | A | 5/1970 | Sesholtz |
| 3,540,591 | A | 11/1970 | Yamazaki |
| 3,566,840 | A | 3/1971 | Willinger |

(Continued)

FOREIGN PATENT DOCUMENTS

GB        2 248 558 A      4/1992

(Continued)

OTHER PUBLICATIONS

Eclipse Aquarium Systems, Owner's Manual, System 3, System Six, System Twelve, Marineland Aquarium Products, Oct. 2000.

(Continued)

*Primary Examiner*—Fred Prince
(74) *Attorney, Agent, or Firm*—Andrus, Sceales, Starke & Sawall, LLP

(57) ABSTRACT

An aquarium filter assembly is mounted to an aquarium tank and defines a water flow path therethrough from upstream to downstream from an inlet to an outlet. A replaceable filter element is mounted in a filter chamber.

30 Claims, 7 Drawing Sheets

U.S. PATENT DOCUMENTS

| | | | |
|---|---|---|---|
| 3,669,297 A | 6/1972 | Willinger | |
| 3,717,253 A | 2/1973 | Lovitz | |
| 3,738,494 A | 6/1973 | Willinger et al. | |
| 4,093,547 A | 6/1978 | Sherman et al. | |
| 4,345,997 A | 8/1982 | McConnell, Jr. | |
| 4,735,715 A | 4/1988 | Willinger | |
| 4,761,227 A | 8/1988 | Willinger et al. | |
| 4,842,727 A | 6/1989 | Willinger et al. | |
| 4,880,549 A | 11/1989 | Willinger et al. | |
| 4,997,559 A | 3/1991 | Ellis et al. | |
| 5,053,125 A | 10/1991 | Willinger et al. | |
| 5,160,607 A | 11/1992 | Thiemer et al. | |
| 5,176,824 A | 1/1993 | Willinger et al. | |
| 5,228,986 A | 7/1993 | Ellis et al. | |
| 5,266,190 A | 11/1993 | Tominaga | |
| D353,649 S | 12/1994 | Willinger et al. | |
| 5,397,463 A | 3/1995 | Woltmann | |
| 5,423,978 A | 6/1995 | Snyder et al. | |
| 5,460,722 A | 10/1995 | Chen | |
| 5,522,987 A | 6/1996 | Bresolin | |
| 5,567,315 A | 10/1996 | Weidenmann et al. | |
| 5,571,409 A | 11/1996 | Scarborough | |
| 5,728,293 A | 3/1998 | Guoli et al. | |
| D460,996 S | 7/2002 | Carley et al. | |
| D462,739 S | 9/2002 | Carley et al. | |
| D468,393 S | 1/2003 | Agresta et al. | |
| 6,692,637 B2 | 2/2004 | Fox et al. | |
| 6,706,176 B1 | 3/2004 | Goldman | |
| D494,251 S | 8/2004 | Fox, Jr. et al. | |
| 6,797,163 B2 | 9/2004 | Carley et al. | |
| 6,866,773 B2 | 3/2005 | Margovsky et al. | |
| 7,033,491 B2 | 4/2006 | Chang | |
| 7,429,321 B2 | 9/2008 | Willinger | |
| 2004/0238426 A9 | 12/2004 | Fox et al. | |
| 2005/0284397 A1 | 12/2005 | Carley et al. | |
| 2006/0000755 A1 | 1/2006 | Carley et al. | |

FOREIGN PATENT DOCUMENTS

| | | |
|---|---|---|
| JP | 61-230786 A | 10/1986 |
| JP | 10-80611 A | 3/1998 |
| JP | 2006-149221 A | 6/2006 |

OTHER PUBLICATIONS

Eclipse—The Filtration & Illumination System, Owner's Manual, Eclipse1, Eclipse 2, Eclipse3, Marineland Aquarium Products, Mar. 2000.

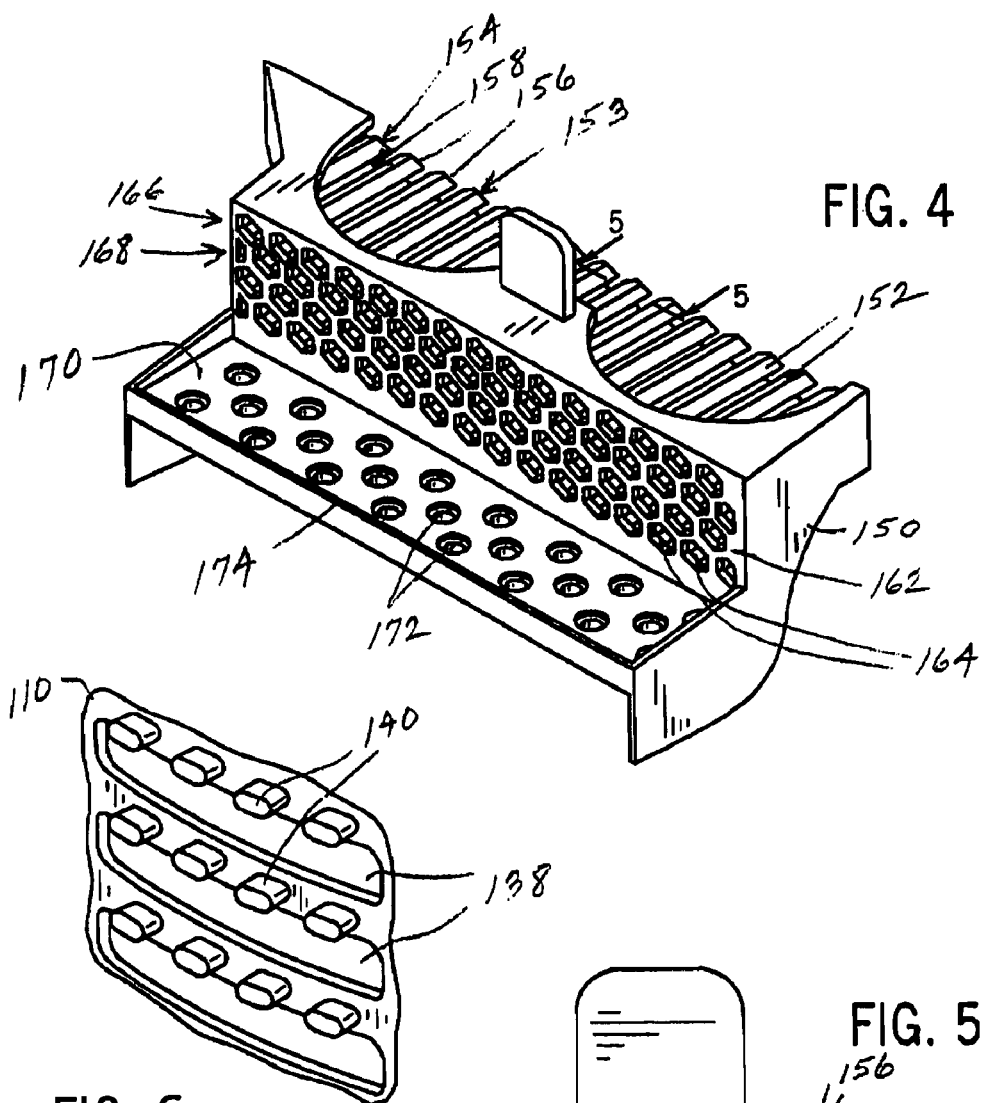
FIG. 4
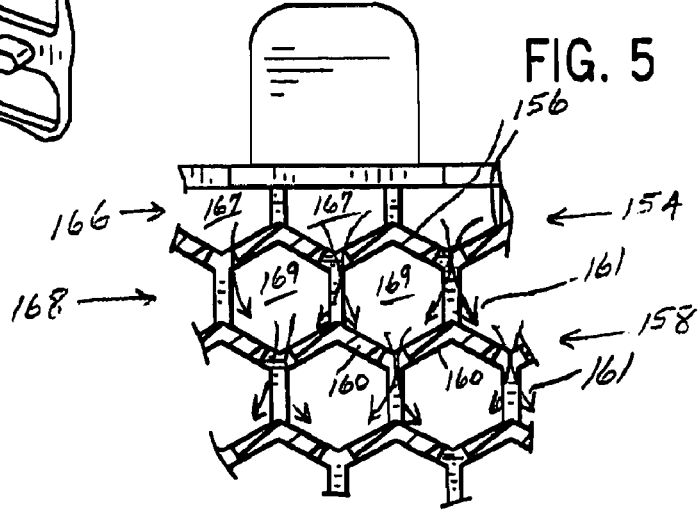
FIG. 6
FIG. 5

AQUARIUM FILTER

CROSS-REFERENCE TO RELATED APPLICATIONS

This application is a divisional of U.S. patent application Ser. No. 11/696,767, filed Apr. 5, 2007, now U.S. Pat. No. 7,618,534 which claims the benefit of and priority from Provisional U.S. Patent Application No. 60/791,830, filed Apr. 13, 2006.

BACKGROUND AND SUMMARY

The invention relates to aquarium filters and assemblies.

Aquarium filters and assemblies are known in the prior art. The present invention arose during continuing development efforts directed toward improved product construction, performance and features.

BRIEF DESCRIPTION OF THE DRAWINGS

FIG. 4 is an enlarged perspective view of a component of FIG. 3.

FIG. 5 is a sectional view taken along line 5-5 of FIG. 4.

FIG. 6 is an enlarged view of a portion of FIG. 3 at line 6-6.

DETAILED DESCRIPTION

Figure 1:
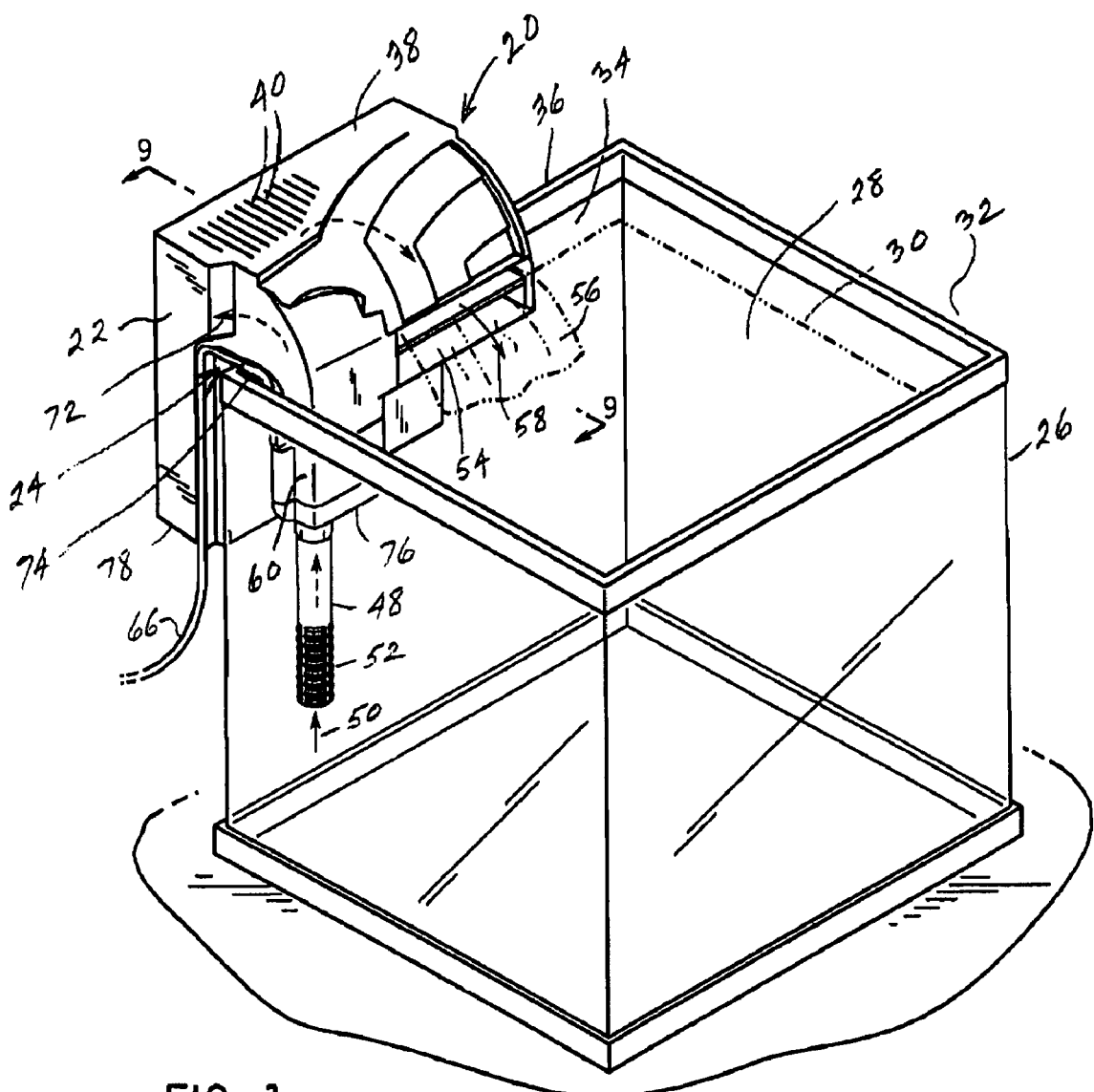
FIG. 1 is a perspective view of an aquarium filter assembly mounted to an aquarium tank.

FIG. 1 shows an aquarium filter assembly 20 including a housing 22 having mounting structure 24 for mounting to an aquarium tank 26. The tank has an interior 28 holding aquarium water therein as shown at water line 30, and has an exterior at 32. The tank has a sidewall 34 with a top 36. The housing has a removable top cover 38, FIG. 2, having vent openings or slits 40. A filter cartridge 42 is provided in the housing and has an upstream face 44, FIG. 3, and a downstream face 46. The housing has an inlet 48 receiving dirty aquarium water as shown at arrow 50 through inlet grate or screen 52, and has an outlet 54 returning clean filtered water to the tank, as shown at water flow 56 at arrow 58. The housing defines a water flow path therethrough from upstream to downstream from inlet 48 to outlet 54. A water pump 60 in the housing is at least partially submerged in the water in the tank and pumps water along the noted flow path by means of impeller 62 driven by electric motor 64 connected to a source of electrical power by power cord 66 to pump water from pumping chamber 68 upwardly through channel 70 as shown at arrow 72 in FIGS. 7, 9, to pump the water along the noted flow path through the housing. Housing 22 is an inverted U-shaped saddle having an upper bight 74, FIGS. 1-3, 9 at the top 36 of sidewall 34 of the tank, and having inner and outer legs 76 and 78, respectively, depending downwardly from bight 74. Inner leg 76 extends into the interior 28 of tank 26. Outer leg 78 extends along the exterior 32 of tank 26. Filter cartridge 42 is in outer leg 78. Water pump 60 is in inner leg 76. Motor 60 is detachable from the housing at living hinge spring clip 61.

Housing 22 has a filter chamber 80, FIGS. 2, 3, 7, 9, receiving filter cartridge 42 therein. The filter cartridge divides filter chamber 80 into a filter inlet plenum 82 receiving water from inlet 48, and a filter outlet plenum 84 delivering water to outlet 54. Upstream face 44 of the filter cartridge faces filter inlet plenum 82. Downstream face 46 of the filter cartridge faces filter outlet plenum 84. Housing 22 has a supply plenum 86 receiving water from water pump 60 through channel 70 and passage 71, and supplying the water to filter inlet plenum 82. Supply plenum 86 has an overflow bypass passage 88, FIGS. 7, 9, 10, supplying water from supply plenum 86 to filter outlet plenum 84 and bypassing filter cartridge 42 in response to clogging of the filter cartridge causing a given rise in water level in housing 22. Supply plenum 86 spans inner and outer legs 76 and 78. Housing 22 has a return plenum 90, FIGS. 7, 9, 10, spanning inner and outer legs 74 and 78 and crossing over the noted top 36 of sidewall 34 of aquarium tank 26 and returning water from filter outlet plenum 84 to outlet 54. Water from overflow bypass passage 88 from supply plenum 86 joins with water in filter outlet plenum 84 and return plenum 90 downstream of downstream face 46 of the filter cartridge. Supply plenum 86 has a cross-over portion 92, FIGS. 3, 7, directly above the top 36 of sidewall 34 of tank 26. Return plenum 90 has a cross-over portion 94 directly above the top 36 of sidewall 34 of tank 26. Cross-over portion 94 has a lower wall 96, FIGS. 3, 7, 9, 10, therealong. Cross-over portion 94 is laterally adjacent cross-over portion 92, and there is a plenum sidewall 98 therebetween. Plenum sidewall 98 extends from lower wall 96 of cross-over portion 94 upwardly to overflow bypass passage 88 at the top of sidewall 98.

Filter chamber 80 and filter cartridge 42 have respective first and second coacting keyed detents 102 and 104, FIGS. 2, 2A, 3, 8, 9, mating with each other to at least one of: a) orient and permit mounting of filter cartridge 42 in filter chamber 80 only with face 44 facing filter inlet plenum 82, and face 46 facing filter outlet plenum 84; and b) permitting mounting of only an authorized filter cartridge in filter chamber 80, namely a filter cartridge having a coacting keyed detent to mate with coacting keyed detent 102 of filter chamber 80. In one embodiment, filter cartridge 42 includes a replaceable filter element 106, FIG. 3, having the noted second detent 104. First and second detents 102 and 104 are aligned with each other and non-symmetrically disposed in offset relation in filter chamber 80. In one preferred form, first detent 102 is provided by a standing rib extending from housing 22 into filter chamber 80, and second detent 104 is provided by an aligned slot in the filter element receiving standing rib 102 in inserted relation. In another embodiment, the filter element has an auxiliary detent, as shown in dashed line at 108 in FIG. 3, spaced from detent 104 and, upon 180° reversal of orientation of filter element 106, coacting and mating with detent 102 to permit orientation and mounting of filter element 106 in filter chamber 80 in an alternate reversed orientation position with face 44 facing filter outlet plenum 84 rather than filter inlet plenum 82, to permit reversal of orientation of filter element 106 as desired. The orientation of filter element 106 is reversed by removing it from holster 110, to be described, and rotating filter element 106 180° about a vertical axis. If filter element 106 is reversible and can desirably or equivalently filter water flow in either direction, then the inclusion of both detents or slots 104 and 108 is preferred, to enable filter element 106 to be mounted in either of 180° opposite orientations. If filter element 106 has a preferred orientation, for example a differential gradient density filter where it is preferred that face 44 be facing upstream, then only a single detent or slot 104 is preferred, and detent or slot 108 is eliminated, such that filter element 106 can only be mounted and oriented in a single orientation position, namely with face 44 facing upstream toward filter inlet plenum 82. In the two slot version: detents 102 and 104 are aligned with each other and non-symmetrically disposed in offset relation in filter chamber 80 when face 44 faces filter inlet plenum 82; and detents 102 and 108 are aligned with each other and non-symmetrically disposed in offset relation in filter chamber 80 when face 44 faces filter outlet plenum 84, upon reversal of filter element 106. In one embodiment, as noted, detent 102 is provided by a standing rib extending from housing 22 into filter chamber 80, detent 104 is provided by a first slot in filter element 106 aligned with and receiving standing rib 102 in inserted relation when face 44 faces filter inlet plenum 82, and auxiliary detent 108 is provided by a second slot in the filter element aligned with and receiving standing rib 102 in inserted relation when face 44 faces filter outlet plenum 84.

Figures 2, 2A:
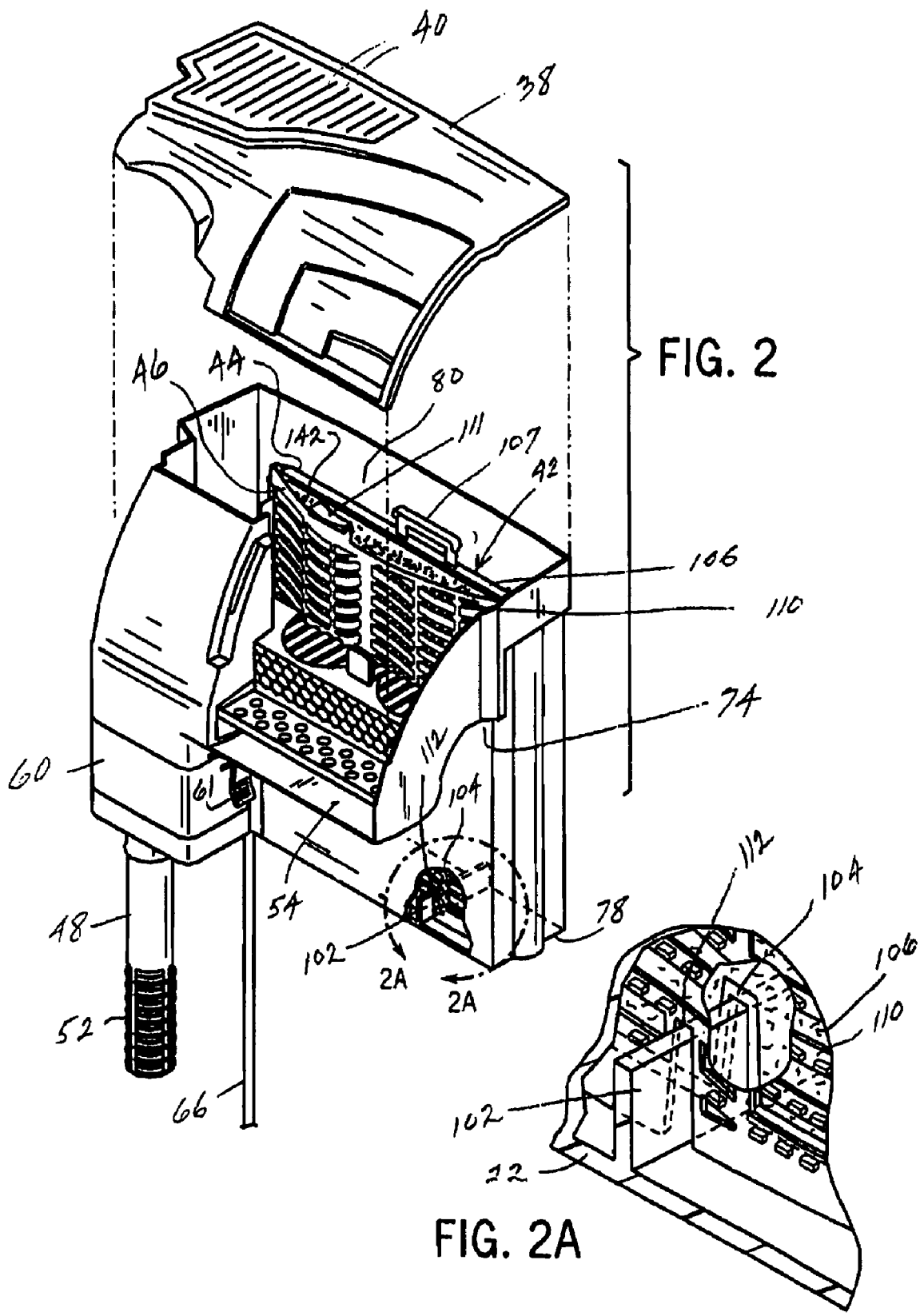
FIG. 2 is a perspective view of the aquarium filter assembly of FIG. 1, partially cut-away and with cover removed.
FIG. 2A is an enlarged view of a portion of FIG. 2 at line 2A-2A.
Figure 3:
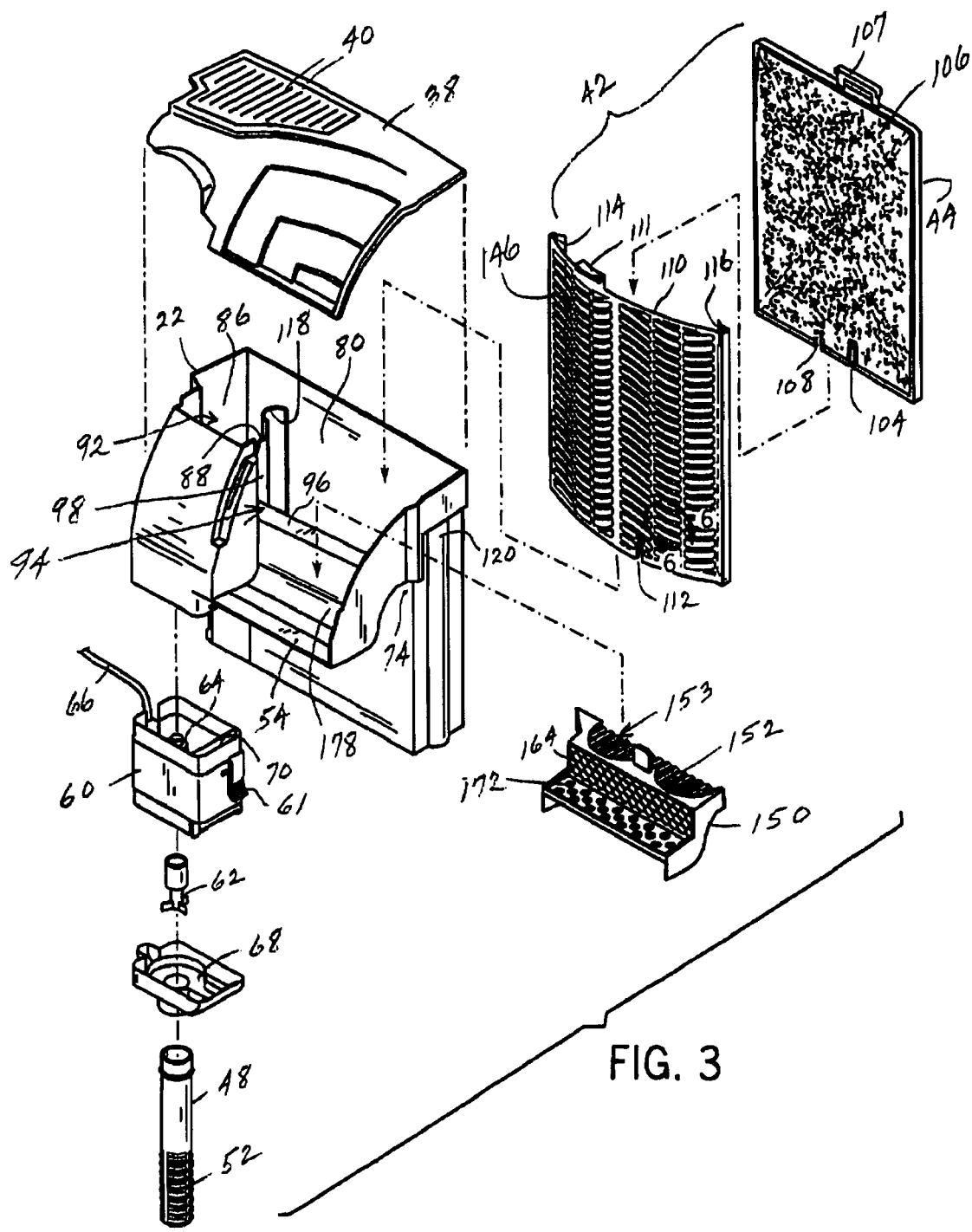
FIG. 3 is an exploded perspective view of the aquarium filter assembly of FIG. 2.

In one embodiment, filter cartridge 42 includes the noted replaceable filter element 106 and may additionally include a holster 110, FIGS. 2, 3. Replaceable filter element 106 is removably supported in holster 110 and is slidable downwardly thereinto. Filter element 106 and holster 110 have respective grip tabs 107 and 111. The holster has a detent 112 aligned with detent 104 and coacting with and mating with detent 102. Detents 102, 104, 112 are aligned with each other and non-symmetrically disposed in offset relation in filter chamber 80. In one embodiment, detent 102 is provided by the noted standing rib extending from housing 22 into filter chamber 80, and detents 104 and 112 are provided by aligned slots receiving standing rib 102 in inserted relation. Auxiliary detent 108 of filter element 106 is spaced from detent 104 and, upon 180° reversal of filter element 106, detent 108 coacts and mates with detent 102 and is aligned with detent 112 to permit orientation and mounting of filter element 106 in holster 110 in filter chamber 80 with face 44 facing filter outlet plenum 84, to permit reversal of orientation of filter element 106 as desired. As above, if filter element 106 has a preferred orientation, then slot 108 is eliminated, which in turn permits orientation and mounting of filter element 106 in the filter chamber 80 only with face 44 facing filter inlet plenum 82. If optional dual alternate orientation is desired, then slot 108 is provided, and: detents 102, 104, 112 are aligned with each other and non-symmetrically disposed in offset relation in filter chamber 80 when face 44 faces filter inlet plenum 82; and detents 102, 108, 112 are aligned with each other and non-symmetrically disposed in offset relation in filter chamber 80 when face 44 faces filter outlet plenum 84.

Filter element 106 and holster 110 engage each other in sliding relation along distally opposite guide tracks 114 and 116, FIG. 3, enabling removal of filter element 106 from holster 110. Holster 110 and filter chamber 80 engage each other in sliding relation along distally opposite guide tracks 118 and 120, FIGS. 3, 7, 10, enabling removal of holster 110 from filter chamber 80. Guide tracks 114 and 118 are adjacent and parallel to each other. Guide tracks 116 and 120 are adjacent and parallel to each other.

Figure 7:
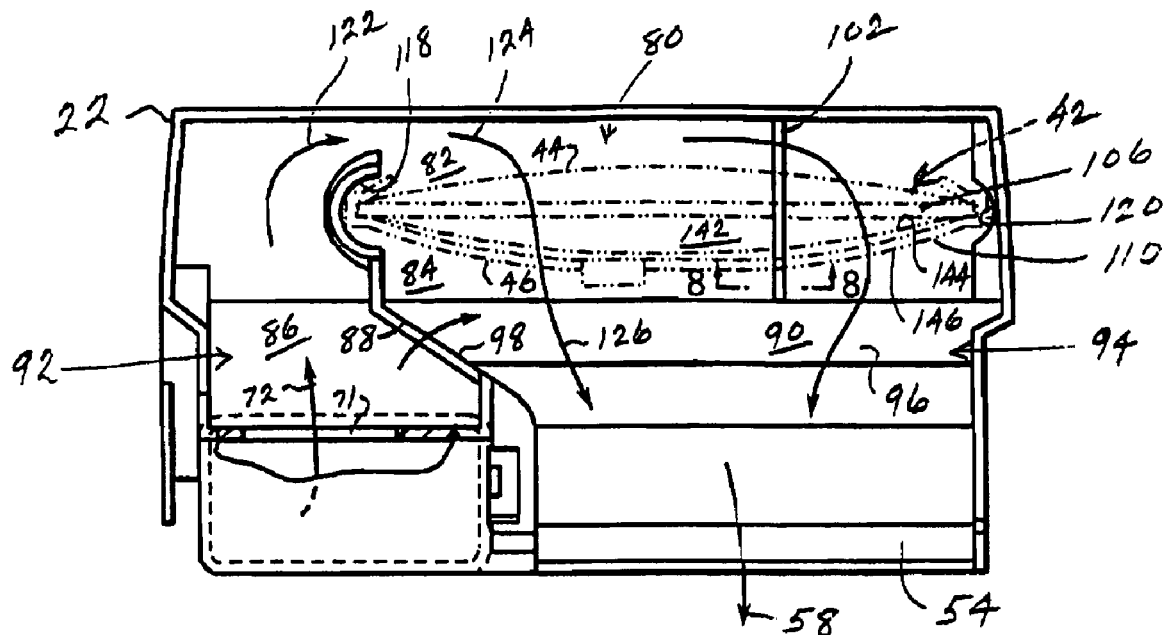
FIG. 7 is a top view of a component of FIG. 3.
Figure 8:
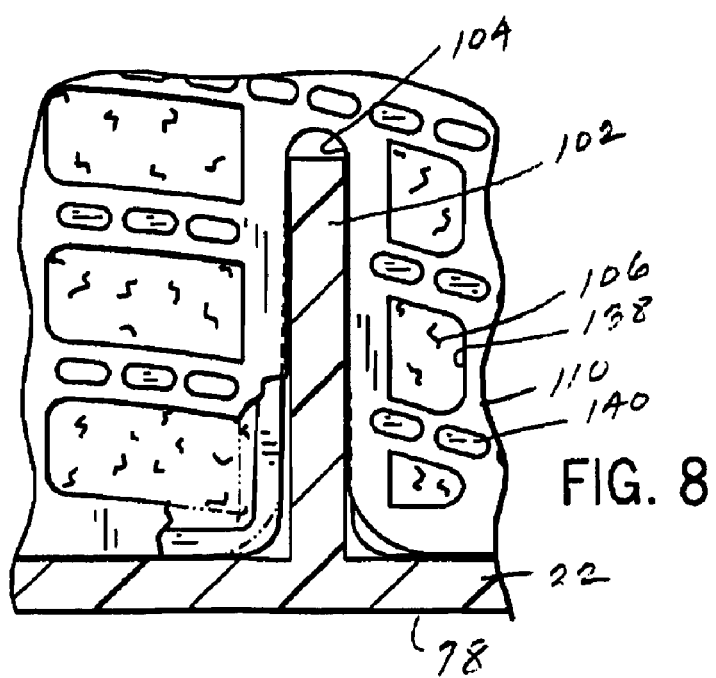
FIG. 8 is a sectional view taken along line 8-8 of FIG. 7.
Figure 9:
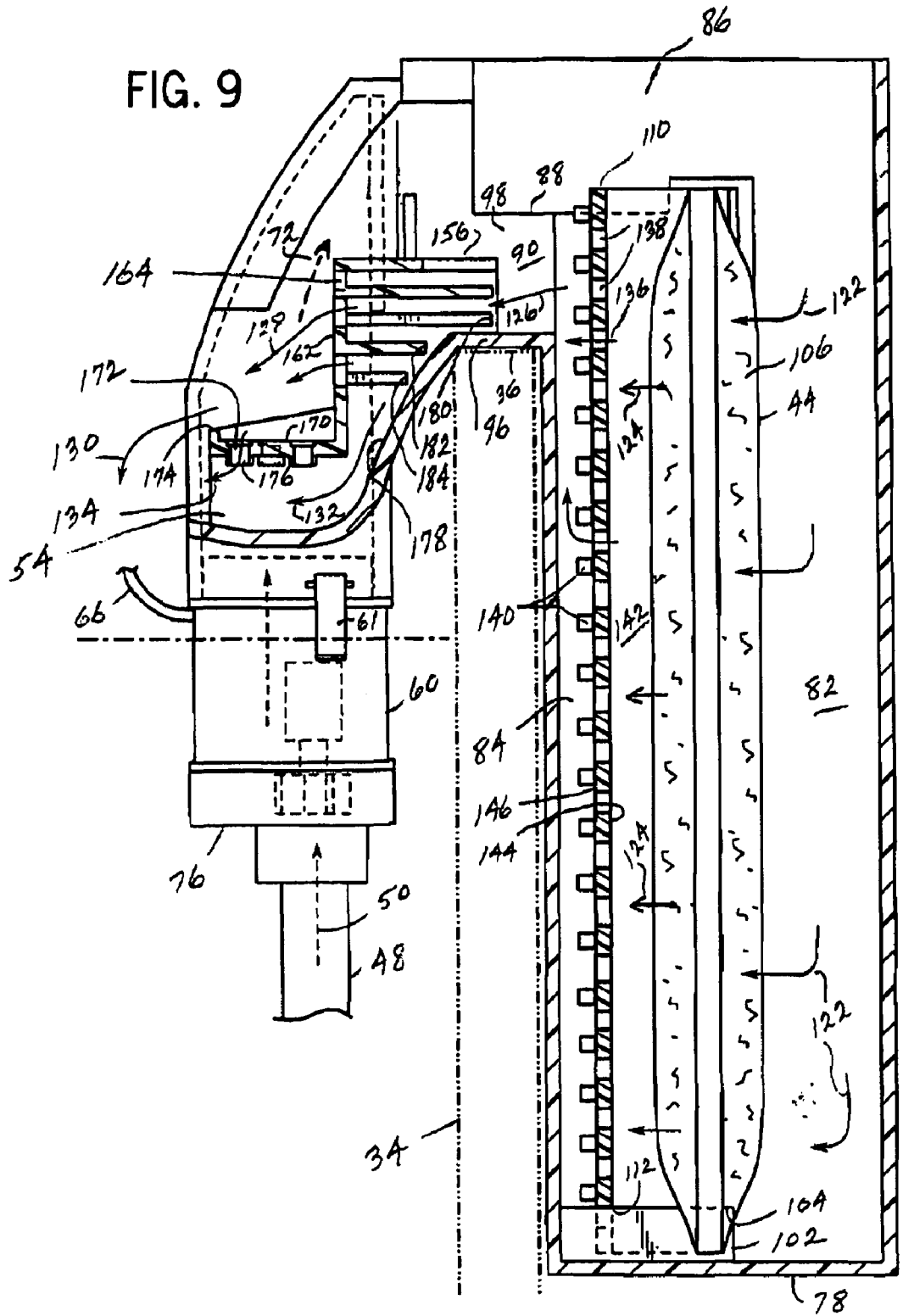
FIG. 9 is a sectional view taken along line 9-9 of FIG. 1.
Figure 10:
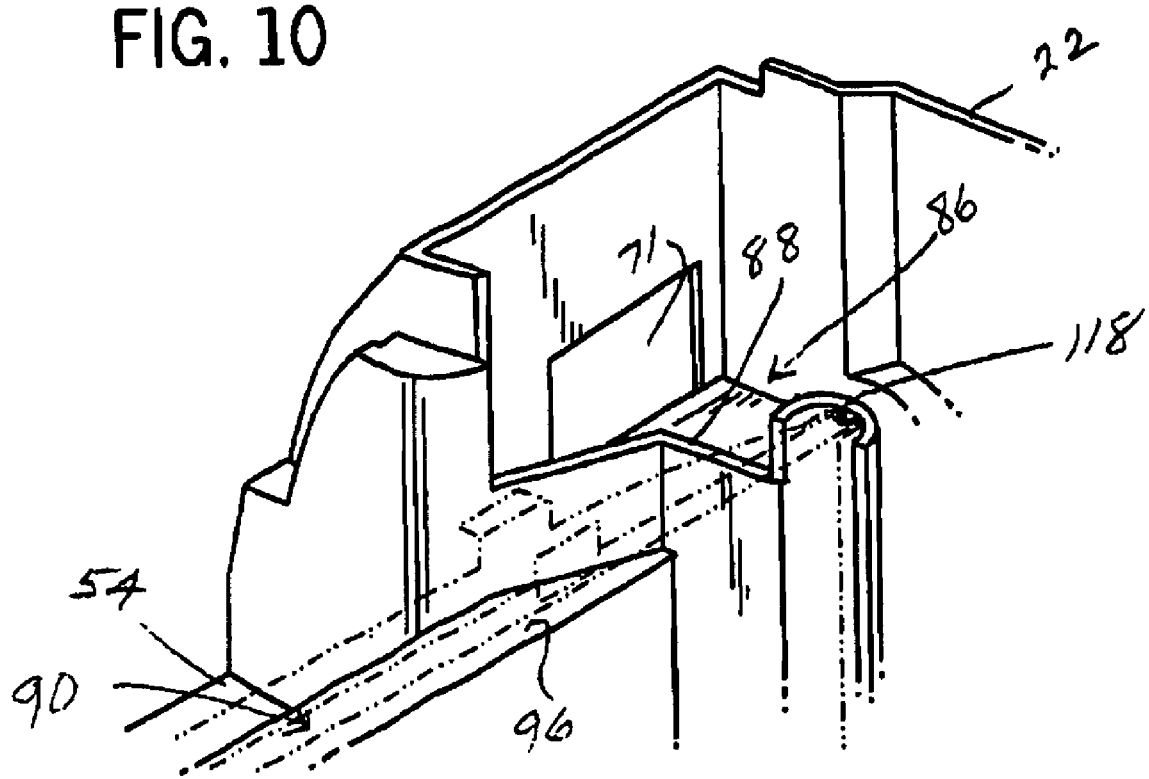
FIG. 10 is an enlarged perspective view of a component of FIG. 3 from a different angle.

Housing 22 defines a water flow path therethrough from upstream to downstream from inlet 48 to outlet 54 as shown at arrows 50, 72, 122, 124, 126, 128, 130, 132, 134, 58, including a flow path portion 136, FIGS. 7, 9, through the filter cartridge. Holster 110 has a plurality of water flow openings 138 therethrough, FIGS. 6, 8, providing water flow along flow path portion 136. The holster has a plurality of biological reactant surface area protrusions 140 extending therefrom along flow path portion 136 adjacent water flow openings 138. It is known in the prior art to provide biological filtration in aquariums by means of surfaces collecting beneficial bacteria to eliminate toxic ammonia and nitrites, in addition to the mechanical filtration provided by filter element 106, and in addition to chemical filtration which may be provided by filter element 106 additionally containing activated carbon to remove toxic impurities, odors, and discoloration. Filter element 106 and holster 110 have an intermediate plenum 142 therebetween, FIGS. 2, 7, 9. Intermediate plenum 142 is downstream of filter inlet plenum 82, and is upstream of filter outlet plenum 84. Holster 110 has a first face 144 facing intermediate plenum 142, and has a second face 146 facing oppositely from first face 144. Biological reactant surface area protrusions 140 extend from one of such faces, preferably face 146. Holster 110 is preferably downstream of filter element 106, and face 146 of the holster faces filter outlet plenum 84, and biological reactant surface area protrusions 140 extend from face 146 into filter outlet plenum 84.

In a further embodiment, the filter assembly housing outlet 54 has a removable insert 150, FIGS. 3, 4, having a plurality of biological reactant surface area protrusions 152 along flow path portion 126, 128 through outlet 54. Biological reactant surface area protrusions 152 are provided by a plurality of canopies 153, namely a first row 154 of a plurality of canopies 156, and a second row 158, FIG. 5, of a plurality of canopies 160 spaced below and offset from first row 154, and third and so on rows, such that water falls in cascade manner along the canopies, as shown at arrows 161 in FIG. 5. The insert 150 has a vertical wall 162 having a plurality of transfer openings 164 therethrough, including a first row 166 of transfer openings 167 from which first row 154 of canopies 156 extend horizontally as cantilevers, FIGS. 4, 9, and a second row 168 of transfer openings 169 from which the second row 158 of canopies 160 extend horizontally as cantilevers, and so on. In FIG. 5, canopies 153 extend out of the page toward the viewer. Insert 150 includes a horizontal wall 170 on the opposite side of vertical wall 162 from canopies 153 and below transfer openings 164 such that water flow along the noted outlet flow path portion through outlet 54 cascades along the canopies as shown at arrows 161 in FIG. 5, and then some of the water flows through transfer openings 164 as shown at arrow 128 in FIG. 9 and then flows along horizontal wall 170. The water flow thus steps down in staircase manner from canopies 153 to transfer openings 164 to horizontal wall 170. Horizontal wall 170 has a plurality of discharge openings 172 therein discharging water therethrough back to tank 26. Water which does not flow through discharge openings 172 will spill over the overflow edge lip 174 of wall 170. A plurality of short tubular extensions 176 extend downwardly from horizontal wall 170 from respective discharge openings 172 and provide additional biological reactant surface area protrusions along the inner walls thereof. The water flow cascading at 161 along canopies 153 which does not flow through transfer openings 164 flows downwardly as shown at 132 in FIG. 9 along sloped housing surface 178, and is discharged at outlet 54 beneath horizontal wall 170 of insert 150. In normal operation, the primary flow path is along sloped housing surface 178 as shown at arrow 132, and the water flow path at 128, 130, 134 through the water polisher 150 is an auxiliary flow path. Removable insert 150 has the noted canopies 153, vertical wall 162, and horizontal wall 170. Insert 150 provides a water polisher grid further filtering and charging and aerating the water with extra oxygen creating additional biological filtration, and also providing a quiet water return. The lower rows of canopies are of differing horizontal cantilever length, for example as shown at 180, 182, 184, FIG. 9, to accommodate sloped housing surface 178.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An aquarium filter assembly comprising a housing having mounting structure for mounting to an aquarium tank, a removable filter cartridge in said housing, said filter cartridge having a first face and an opposite second face, said housing having a filter chamber receiving said filter cartridge therein, said filter cartridge dividing said filter chamber into a filter inlet plenum and a filter outlet plenum, said filter chamber and said filter cartridge respectively having first and second coacting keyed detents mating with each other to at least one of: a) orient and permit mounting of said filter cartridge in said filter chamber only with said first face facing said filter inlet plenum, and said second face facing said filter outlet plenum; and b) permit mounting of only an authorized filter cartridge in said filter chamber, namely a filter cartridge having said second coacting keyed detent to mate with said first coacting keyed detent of said filter chamber.

2. The aquarium filter assembly according to claim 1 wherein said filter cartridge comprises a replaceable filter element having said second detent.

3. The aquarium filter assembly according to claim 2 wherein said first and second detents are aligned with each other and non-symmetrically disposed in offset relation in said filter chamber.

4. The aquarium filter assembly according to claim 3 wherein said first detent comprises a standing rib extending from said housing into said filter chamber, and said second detent comprises an aligned slot receiving said standing rib in inserted relation.

5. The aquarium filter assembly according to claim 2 wherein said filter element has an auxiliary detent spaced from said second detent and coacting and mating with said first detent to permit orientation and mounting of said filter element in said filter chamber in an alternate reversed orientation position with said first face facing said filter outlet plenum, to permit reversal of orientation of said first face as desired.

6. The aquarium filter assembly according to claim 5 wherein:
said first and second detents are aligned with each other and non-symmetrically disposed in offset relation in said filter chamber when said first face faces said filter inlet plenum;
said first detent and said auxiliary detent are aligned with each other and non-symmetrically disposed in offset relation in said filter chamber when said first face faces said filter outlet plenum.

7. The aquarium filter assembly according to claim 6 wherein said first detent comprises a standing rib extending from said housing into said filter chamber, said second detent comprises a first slot in said filter element aligned with and receiving said standing rib in inserted relation when said first face faces said filter inlet plenum, and said auxiliary detent comprises a second slot in said filter element aligned with and receiving said standing rib in inserted relation when said first face faces said filter outlet plenum.

8. The aquarium filter assembly according to claim 1 wherein said filter cartridge comprises a replaceable filter element removably supported in a holster, said filter element having said second detent, said holster having a third detent aligned with said second detent and coacting with and mating with said first detent.

9. The aquarium filter assembly according to claim 8 wherein said first, second and third detents are aligned with each other and non-symmetrically disposed in offset relation in said filter chamber.

10. The aquarium filter assembly according to claim 9 wherein said first detent comprises a standing rib extending from said housing into said filter chamber, and said second and third detents respectively comprise first and second aligned slots receiving said standing rib in inserted relation.

11. The aquarium filter assembly according to claim 8 wherein said filter element has an auxiliary detent spaced from said second detent and coacting and mating with said first detent and aligned with said third detent to permit orientation and mounting of said filter element in said holster in said filter chamber with said first face facing said filter outlet plenum, to permit reversal of orientation of said first face as desired.

12. The aquarium filter assembly according to claim 11 wherein:
said first, second and third detents are aligned with each other and non-symmetrically disposed in offset relation in said filter chamber when said first face faces said filter inlet plenum;
said first, third and auxiliary detents are aligned with each other and non-symmetrically disposed in offset relation in said filter chamber when said first face faces said filter outlet plenum.

13. The aquarium filter assembly according to claim 12 wherein said first detent comprises a standing rib extending from said housing into said filter chamber, said second and third detents respectively comprise first and second aligned slots receiving said standing rib in inserted relation when said first face faces said filter inlet plenum, and said auxiliary detent comprises a third slot aligned with said second slot and receiving said standing rib in inserted relation when said first face faces said filter outlet plenum.

14. The aquarium filter assembly according to claim 8 wherein said filter element and said holster engage each other in sliding relation along first and second distally opposite guide tracks enabling removal of said filter element from said holster, and wherein said holster and said filter chamber engage each other in sliding relation along third and fourth distally opposite guide tracks enabling removal of said holster from said filter chamber.

15. The aquarium filter assembly according to claim 14 wherein said first and third guide tracks are adjacent and parallel to each other, and said second and fourth guide tracks are adjacent and parallel to each other.

16. A filter cartridge for an aquarium filter assembly having a housing having mounting structure for mounting to an aquarium tank, said filter cartridge having a first face and an opposite second face, said housing having a filter chamber receiving said filter cartridge therein, said filter cartridge dividing said filter chamber into a filter inlet plenum and a filter outlet plenum, said filter chamber and said filter cartridge respectively having first and second coacting keyed detents mating with each other to at least one of: a) orient and permit mounting of said filter cartridge in said filter chamber only with said first face facing said filter inlet plenum and said second face facing said filter outlet plenum; and b) permit mounting of only an authorized filter cartridge in said filter chamber, namely a filter cartridge having said second coacting keyed detent to mate with said first coacting keyed detent of said filter chamber.

17. The filter cartridge according to claim 16 wherein said filter cartridge comprises a replaceable filter element having said second detent.

18. The filter cartridge according to claim 17 wherein said first and second detents are aligned with each other and non-symmetrically disposed in offset relation in said filter chamber.

19. The filter cartridge according to claim 18 wherein said first detent comprises a standing rib extending from said housing into said filter chamber, and said second detent comprises an aligned slot in said filter element receiving said standing rib in inserted relation.

20. The filter cartridge according to claim 17 wherein said filter element has an auxiliary detent spaced from said second detent and coacting and mating with said first detent to permit orientation and mounting of said filter element in said filter chamber in an alternate reversed orientation position with said first face facing said filter outlet plenum, to permit reversal of orientation of said first face if desired.

21. The filter cartridge according to claim 20 wherein:
said first and second detents are aligned with each other and non-symmetrically disposed in offset relation in said filter chamber when said first face faces said filter inlet plenum;
said first detent and said auxiliary detent are aligned with each other and non-symmetrically disposed in offset relation in said filter chamber when said first face faces said filter outlet plenum.

22. The aquarium filter assembly according to claim 21 wherein said first detent comprises a standing rib extending from said housing into said filter chamber, said second detent comprises a first slot in said filter element aligned with and receiving said standing rib in inserted relation when said first face faces said filter inlet plenum, and said auxiliary detent comprises a second slot in said filter element aligned with and receiving said standing rib in inserted relation when said first face faces said filter outlet plenum.

23. The filter cartridge according to claim 16 wherein said filter cartridge comprises a replaceable filter element removably supported in a holster, said filter element having said second detent, said holster having a third detent aligned with said second detent and coacting and mating with said first detent.

24. The filter cartridge according to claim 23 wherein said first, second and third detents are aligned with each other and non-symmetrically disposed in offset relation in said filter chamber.

25. The filter cartridge according to claim 24 wherein said first detent comprises a standing rib extending from said housing into said filter chamber, and said second and third detents respectively comprise first and second aligned slots receiving said standing rib in inserted relation.

26. The filter cartridge according to claim 23 wherein said filter element has an auxiliary detent spaced from said second detent and coacting and mating with said first detent and aligned with said third detent to permit orientation and mounting of said filter element in said holster in said filter chamber with said first face facing said filter outlet plenum, to permit reversal of orientation of said first face as desired.

27. The filter cartridge according to claim 26 wherein:
said first, second and third detents are aligned with each other and non-symmetrically disposed in offset relation in said filter chamber when said first face faces said filter inlet plenum;
said first, third and auxiliary detents are aligned with each other and non-symmetrically disposed in offset relation in said filter chamber when said first face faces said filter outlet plenum.

28. The filter cartridge according to claim 27 wherein said first detent comprises a standing rib extending from said housing into said filter chamber, said second and third detents respectively comprise first and second aligned slots receiving said standing rib in inserted relation when said first face faces said filter inlet plenum, and said auxiliary detent comprises a third slot aligned with said second slot and receiving said standing rib in inserted relation when said first face faces said filter outlet plenum.

29. The filter cartridge according to claim 23 wherein said filter element and said holster engage each other in sliding relation along first and second distally opposite guide tracks enabling removal of said filter element from said holster, and wherein said holster and said filter chamber engage each other in sliding relation along third and fourth distally opposite guide tracks enabling removal of said holster from said filter chamber.

30. The replaceable filter cartridge according to claim 29 wherein said first and third guide tracks are adjacent and parallel to each other, and said second and fourth guide tracks are adjacent and parallel to each other.

* * * * *